(12) United States Patent
Sloan

(10) Patent No.: US 6,279,303 B2
(45) Date of Patent: Aug. 28, 2001

(54) METHOD OF BANDING THE MANE OF A HORSE AND APPARATUS THEREFOR

(76) Inventor: Stewart E. Sloan, 12624 Izard St., Omaha, NE (US) 68154

( * ) Notice: Subject to any disclaimer, the term of this patent is extended or adjusted under 35 U.S.C. 154(b) by 0 days.

(21) Appl. No.: 09/799,399

(22) Filed: Mar. 5, 2001

Related U.S. Application Data

(62) Division of application No. 09/457,987, filed on Dec. 9, 1999.

(51) Int. Cl.[7] .................. B68B 5/00; B68B 5/04
(52) U.S. Cl. .................................... 54/1; 54/78
(58) Field of Search ............ 54/1, 78; 119/850; 606/117; 132/200, 276, 280

(56) References Cited

U.S. PATENT DOCUMENTS

| | | | |
|---|---|---|---|
| 388,670 | * 8/1888 | Haldeman | 54/78 |
| 406,123 | * 7/1889 | Cash | 54/78 |
| 640,917 | * 1/1900 | Jones | 54/78 |
| 737,601 | * 9/1903 | Felsberg | 54/78 |
| 868,364 | * 10/1907 | Read | 54/78 |
| 971,519 | * 10/1910 | Brannen | 132/107 |
| 5,086,612 | * 2/1992 | Anderson | 54/78 |
| 5,782,068 | * 7/1998 | Flint | 54/1 |

* cited by examiner

Primary Examiner—Peter M. Poon
Assistant Examiner—Son T. Nguyen
(74) Attorney, Agent, or Firm—Zarley, McKee, Thomte, Voorhees & Sease; Dennis L. Thomte

(57) ABSTRACT

A method of banding the mane of a horse is described as well as the apparatus for performing the method. The method of banding the mane of the horse is made possible by a staple gun having generally U-shaped staples provided therein which are stapled around individual groups of hairs. The method comprises the steps of separating the horse's mane into individual mane groups and at least partially encircling each mane group with a selectively removable staple to maintain the mane groups separate from one another.

4 Claims, 4 Drawing Sheets

METHOD OF BANDING THE MANE OF A HORSE AND APPARATUS THEREFOR

CROSS-REFERENCE TO RELATED APPLICATION

This is a divisional application of Petitioner's earlier application Ser. No. 09/457,987 filed Dec. 9, 1999, entitled "A METHOD OF BANDING THE MANE OF A HORSE AND APPARATUS THEREFOR".

BACKGROUND OF THE INVENTION

1. Field of the Invention

This invention relates to a method of banding the mane of a horse whereby a stapler apparatus is used rather than individual rubber bands or the like.

2. Description of the Related Art

Persons showing horses frequently band the manes of the horse so that the mane is more aesthetically pleasing. The conventional method of banding the mane of the horse is to separate the mane into individual groups of hairs with a rubber band or bands then being extended around each of those groups close to the neck of the horse. The conventional method of utilizing rubber bands to band the mane of a horse is extremely time-consuming and is a laborious task.

SUMMARY OF THE INVENTION

A method of banding the mane of a horse and apparatus therefor is disclosed to enable the mane of the horse to be more quickly and easily banded without the use of the conventional rubber bands. The apparatus for performing the method comprises a mane banding staple gun having a handle portion with a body portion extending forwardly from the upper end thereof. A staple magazine is provided in the body portion for containing a plurality of staples and for supplying successive staples to the forward end of the body portion. An actuator assembly is movably mounted in the body portion for discharging a staple from the forward end of the body portion and for causing the staple to encircle and embrace a portion of the horse's mane to band the same. A trigger assembly is operatively connected to the actuator assembly for selectively operating the same.

The method of banding the mane of a horse comprises the steps of: (1) separating the horse's mane into individual mane groups; and (2) at least partially encircling each mane group with a selectively removable staple to maintain each of the mane groups separate from one another.

It is therefore a principal object of the invention to provide an improved method of banding the mane of a horse.

Another object of the invention is to provide a staple gun which is used in the banding process.

Still another object of the invention is to provide a method of banding the mane of a horse which is much less time-consuming than the conventional rubber band method of banding the mane.

Still another object of the invention is to provide a staple gun for banding the mane of a horse which is convenient and safe to use.

These and other objects will be apparent to those skilled in the art.

DESCRIPTION OF THE PREFERRED EMBODIMENT

Figure 1:
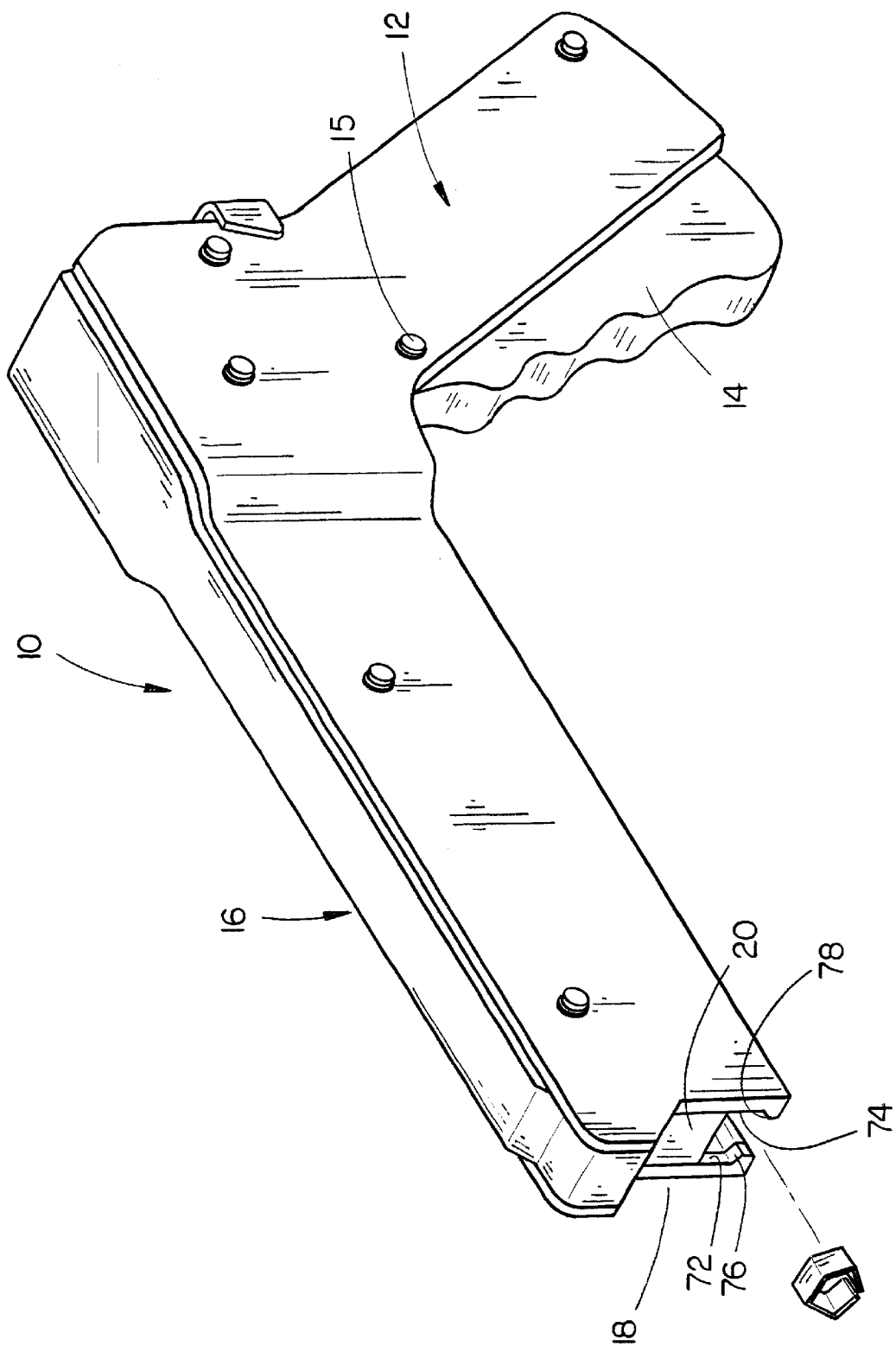
FIG. 1 is front perspective view of the staple gun which is utilized in the method of this invention.

The mane banding staple gun (stapler) of this invention is referred to generally by the reference numeral 10. Gun 10 includes a handle or handle grip portion 12 having a trigger 14 pivotally connected thereto by means of pin 15 to enable the trigger to be moved between its inactive forward position (FIG. 1) and the rearward position illustrated in FIG. 2. Gun 10 includes a barrel or body portion 16 which extends forwardly from the upper end of handle 12 and which has an open forward end 18 partially closed by a staple retaining plate 20.

Figure 2:
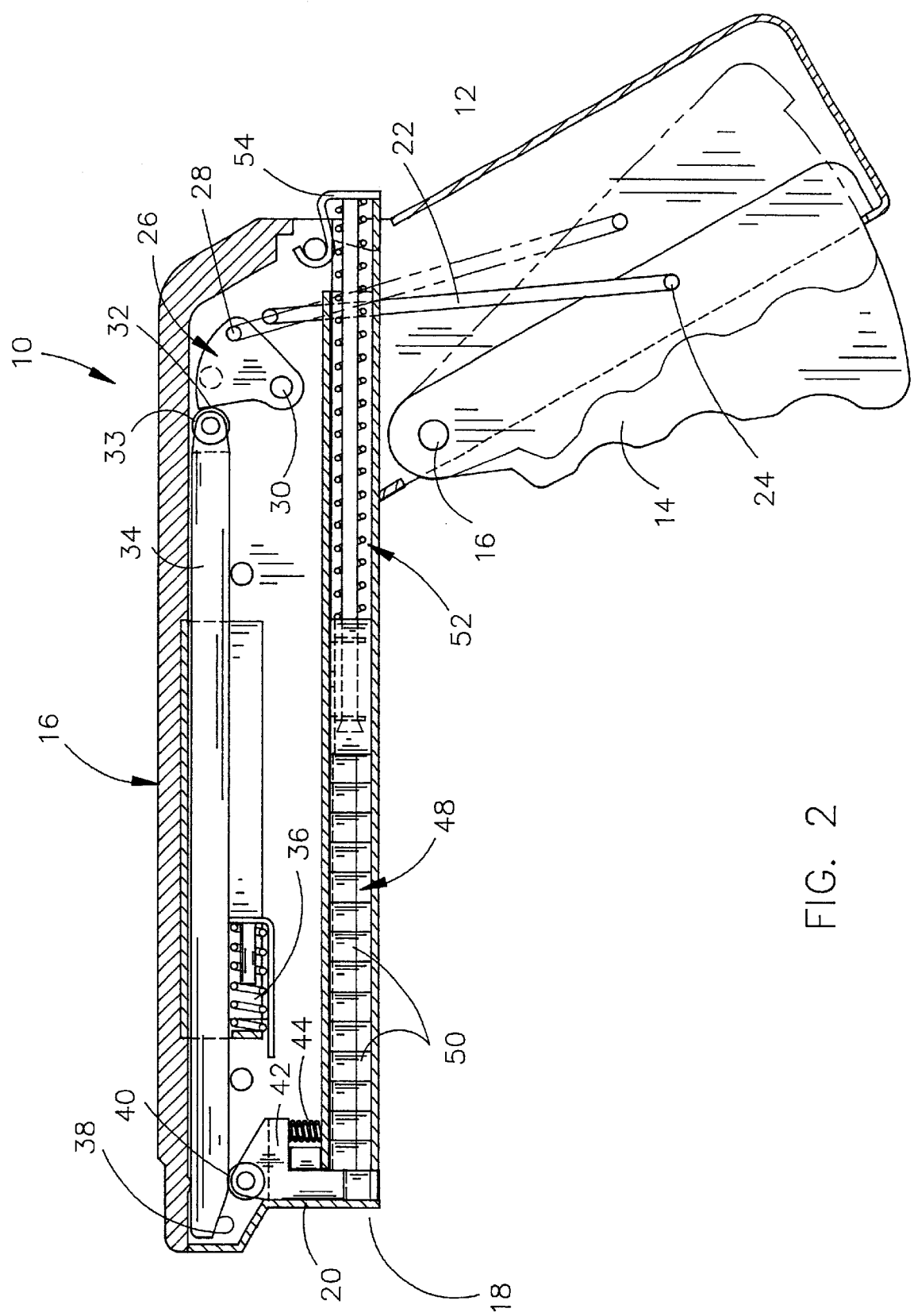
FIG. 2 is a side view of the staple gun of this invention with portions thereof cut away to more fully illustrate the invention.
Figure 4:
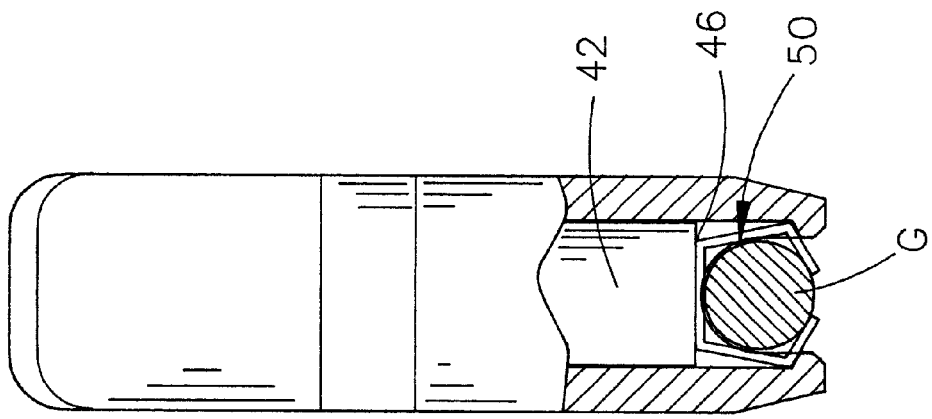
FIG. 4 is a view similar to FIG. 3 except that the staple has been closed around the group of mane hairs.
Figure 3:
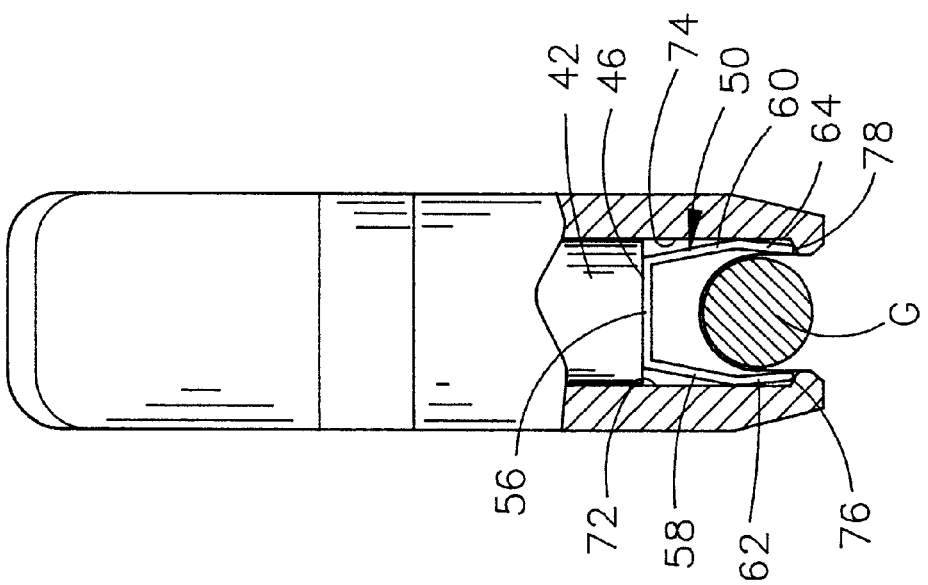
FIG. 3 is an end view illustrating the unfastened staple positioned adjacent a group of mane hairs.
Figure 5:
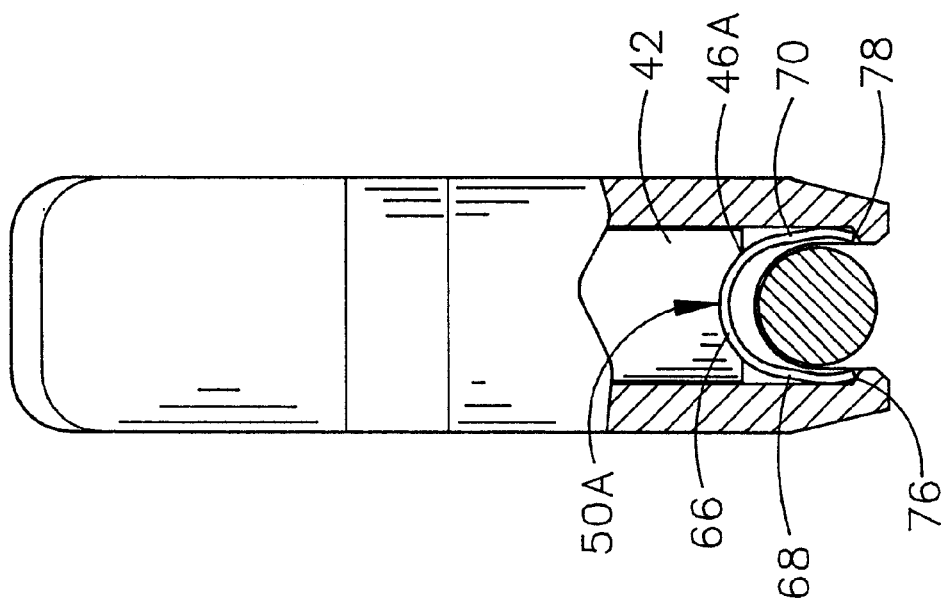
FIG. 5 is a view similar to FIG. 3 except that a modified form of the staple is disclosed.

As seen in FIG. 2, arm 22 is pivotally connected at its lower end to trigger 14 within handle 12 at 24 and is pivotally connected at its upper end to plate 26 at 28. Plate 26 is pivotally mounted to the barrel portion 16 in the interior thereof at 30. The upper forward end 32 of plate 26 engages a roller 33 which is rotatably mounted on the rearward end of an elongated, longitudinally movable arm or shaft 34 which is biased rearwardly by means of spring assembly 36. The forward end of shaft 34 is tapered at 38 for engagement with roller 40 which is mounted on the upper end of a vertically movable actuator 42 which is biased upwardly by means of spring 44. When shaft 34 is moved forwardly as trigger 14 is depressed, the tapered portion 38 of shaft 34 engages roller 40, thereby moving actuator 42 downwardly against the resiliency of spring 42. When trigger 14 is released, spring 44 urges actuator 42 upwardly which in turn causes shaft 34 to be moved rearwardly which in turn moves trigger 14 to its forward position. In the form of the invention shown in FIGS. 3 and 4, the lower end 46 of actuator 42 is flat while in the form of the invention shown in FIGS. 5 and 6, the lower end 46A of actuator 42 is arcuate, as will be explained in more detail hereinafter.

A staple magazine 48 is provided in barrel portion 16 for containing a plurality of staples 50 therein in a side-by-side relationship in the manner of most staple guns. A spring assembly 52 is mounted in barrel portion 16 rearwardly of the staples 50 for urging the staples 50 towards the forward end 18 of gun 10 in conventional fashion. The magazine 48 is loaded at 54 in conventional fashion. In the preferred embodiment, staple 50 has a flat upper end 56, leg portions 58 and 60 which extend downwardly and outwardly from the ends of upper end 56, and leg portions 62 and 64 which extend downwardly and inwardly from the lower ends of leg portions 58 and 60, respectively. In an alternative embodiment of FIGS. 5 and 6, the staple 50A seen in FIGS. 5 and 6 includes an arcuate upper end 66, and arcuate leg portions 68 and 70 extending downwardly from opposite ends thereof. It is preferred that staples 50 and 50A either be comprised of a rubber material or be comprised of a metal material embedded in rubber so that injury to the horse or horse's mane will not occur.

Figure 6:
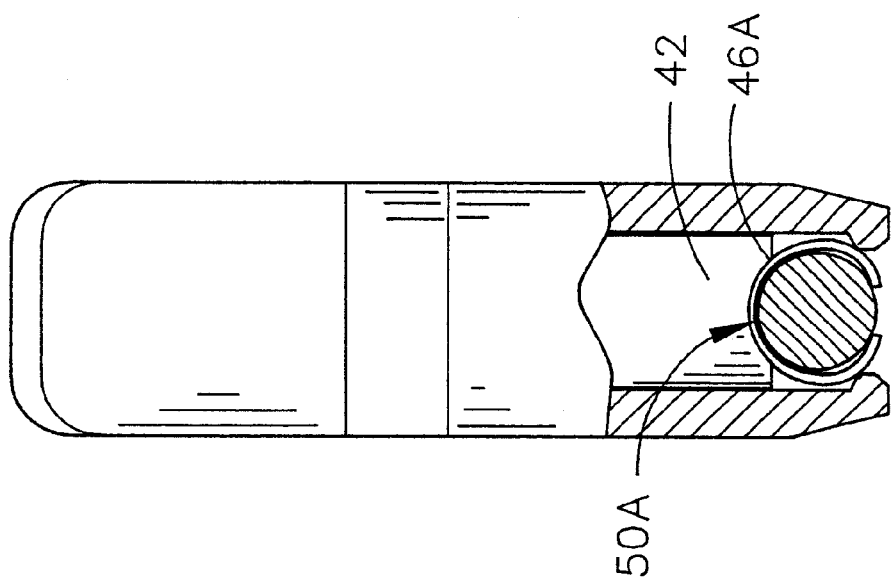
FIG. 6 is a view similar to FIG. 4 except that it illustrates a modified form of the staple.

When staple 50 is utilized, the interior wall surfaces 72 and 74 of the forward end of the gun have inwardly and downwardly extending shoulders 76 and 78 provided at the lower ends thereof which are adapted to prevent the forwardmost staple 50 in magazine 48 from dropping downwardly therefrom. When actuator 42 is moved downwardly from the position of FIG. 3 to the position of FIG. 4, the engagement of the staple with the shoulders 76 and 78 causes the leg portions 62 and 64 of staple 50 to be bent inwardly beneath the group G. When staple 50A is utilized, the shoulder 76 and 78 also cause the lower ends of the staple to be deflected inwardly beneath the group G, as illustrated in FIG. 6. Retaining plate 20 prevents the forwardmost staple 56 from being ejected from the gun until the staple 56 has been moved downwardly from the magazine 48 by the actuator 42.

When the mane of the horse is to be banded, the mane will normally be combed to remove all of the snarls therefrom. A comb is then used to separate the mane to individual groups of hairs G. The staple gun 10 is then maneuvered to the position of FIG. 3 so that the forwardmost staple 50 or 50A in the staple magazine partially extends around an individual group G. Trigger 14 is then depressed, which causes actuator 42 to move downwardly from the positions of FIGS. 3 and 5 to the positions of FIGS. 4 and 6 so that the staple will be clamped around the group G. The process is repeated until the entire mane has been banded.

The method of this invention and the staple gun utilized in performing the method represent a significant advance in the mane banding art in that the use of the time-consuming rubber band method of banding the horse's mane has been eliminated.

Thus it can be seen that the invention accomplishes at least all of its stated objectives.

I claim:

1. The method of banding the mane of a horse, comprising the steps of:

separating the horse's mane into individual mane groups; and at least partially encircling each mane group with a selectively removable staple to maintain the mane groups separate from one another.

2. The method of claim 1 wherein the removable staple is secured to each of the mane groups by means of a staple gun.

3. The method of claim 1 wherein each mane group is substantially encircled by a staple.

4. The method of claim 1 wherein the staple is coated with a non-metallic material.

* * * * *